April 11, 1961  J. C. McMULLEN  2,978,750
METHOD AND APPARATUS FOR FIBERIZING REFRACTORY MATERIALS
Filed March 3, 1953  2 Sheets-Sheet 1

INVENTOR.
JOHN C. McMULLEN
BY

April 11, 1961  J. C. McMULLEN  2,978,750
METHOD AND APPARATUS FOR FIBERIZING REFRACTORY MATERIALS
Filed March 3, 1953  2 Sheets-Sheet 2

INVENTOR.
JOHN C. McMULLEN
BY

United States Patent Office 2,978,750
Patented Apr. 11, 1961

2,978,750

METHOD AND APPARATUS FOR FIBERIZING REFRACTORY MATERIALS

John C. McMullen, Niagara Falls, N.Y., assignor to The Carborundum Company, Niagara Falls, N.Y., a corporation of Delaware Filed Mar. 3, 1953, Ser. No. 339,996

11 Claims. (Cl. 18—47.3)

This invention relates to the releasing of streams of molten inorganic refractory materials and in particular to apparatus and methods for releasing molten refractory material from a melting furnace in a continuous uniform stream.

Inorganic fibrous materials, other than those found in nature such as asbestos, are usually named according to their origin as slag wool, mineral wool or glass wool. Slag or mineral wool products are usually variable in composition and full of impurities and have been commonly made in a cupola by charging the raw materials from which the fibers are to be made together with an adequate amount of coke or other combustible material into the top of the cupola where they are fused or melted as they pass through the cupola to the bottom where they are tapped and blown into fibers. Glass fibers on the other hand have been usually made by melting the materials constituting the glass composition in an ordinary type of glass tank from which the fibers are drawn or a molten stream poured and mechanically converted to fiber form. The formation of slag or mineral fibers by cupola operation has been acceptable because the materials have naturally contained sizeable proportions of impurities other than those introduced by the irregularities of the cupola operation so that the introduction of other impurities from the coke or other combustible material has not been considered as objectionable. Moreover, the melting range of the slags or mineral matter has been low enough to permit the production of fibers by ordinary cupola operation without untoward difficulties. The latter has been true also in the making of glass fibers in glass tanks, that is, the melting range of the glass compositions has been low enough to permit easy fusion and fiberization of the material at relatively low temperatures.

However, neither the various slag or mineral wools heretofore available on the market, nor the various compositions of ordinary glass fibers available, have been of adequate resistance to high temperatures to meet the needs for an inorganic refractory fiber of extremely high refractoriness. The difficulties encountered in melting certain highly refractory materials in either a cupola furnace or in a conventional glass tank setup have never been satisfactorily overcome.

To fulfill this need for a highly refractory inorganic fiber, refractory compositions such as those disclosed in U.S. Patent No. 2,557,834, issued to John C. McMullen, have been fiberized. One process for fiberizing these compositions consists essentially of impinging a blast of high velocity gas against a falling stream of molten refractory material being released from a melting furnace, causing fiberizing of the material, provided that the velocity of the impinging stream of gas and the volume and viscosity of the molten material are correct.

The method heretofore employed for releasing the stream of molten refractory material from the melting furnace has consisted of pouring the molten material out of a tilting melting furnace over a dam or lip in the forward wall of a forehearth connected to the furnace. This method of pouring the molten material from the furnace is not entirely satisfactory for several reasons. Firstly, by this method it is extremely difficult to pour a stream at a uniform rate of flow. Since there is a maximum amount of molten refractory material which a given blast of high velocity gas is capable of fiberizing, an excessively high percentage of unfiberized material its produced whenever the rate of the poured stream is too great, resulting in an inferior product. Secondly, by this method it is extremely difficult to pour even a relatively satisfactory stream of molten refractory material for more than a few minutes because a layer of solidified material builds up on the pouring lip. When this solidified layer builds up to such an extent that the poured stream is totally unsatisfactory for fiberizing, it is necessary to discontinue pouring so that the accumulation of solidified material can be removed from the pouring lip. Thirdly, by this method it is extremely difficult to pour a stream of molten refractory material at a fixed location. The changing trajectory of the poured stream, caused by the changing tilting of the melting furnace, and the changing position of the stream from side to side, caused by the uneven buildup of solidified material on the pouring lip, make it almost impossible to keep the blast of fiberizing gas impinging on the fallen stream, resulting in very inefficient production. Lastly, by this method of pouring the molten refractory material over the front wall of the forehearth it is extremely difficult to closely control the temperature of the released material, resulting in unsatisfactory fiberizing whenever the temperature of the stream is not within the range wherein satisfactory fiberizing can be carried on.

It is an object of this invention to provide apparatus and methods for the releasing of a continuous stream of molten inorganic refractory material.

Another object is to provide apparatus and methods for releasing a continuous stream of molten refractory material for subsequent fiberizing.

It is a further object to provide apparatus and methods for releasing a stream of molten refractory material at a regulated rate of flow.

Another object is to release a stream of molten refractory material from a melting furnace at a fixed location.

Still another object is to release a stream of molten refractory material at a regulated temperature for subsequent fiberizing.

Other objects and advantages accruing from practice of the present invention will become apparent as the description proceeds.

It has been found that the above and other objects can be accomplished by releasing the molten refractory material by gravity flow through a cooled orifice after applying a regulated amount of heat to the molten refractory material in an area adjacent to the releasing orifice by means of heating electrodes.

It is realized that it is old in the glass-making art to pour molten glass through an orifice. However, that operation does not present the same problems with which the present invention is concerned. Glasses have a viscous working range of as much as 500° C., which range is much longer than the working ranges of the materials used in the practice of the present invention. Furthermore, the working range of glass is over relatively low temperatures, for example from its melting temperature of about 900° C. to perhaps 1400° C. Glass can, therefore, be released through an orifice at a temperature within its working range which temperature is much higher than its solidification temperature, but which temperature is still relatively low. Because of these low working temperatures for glass it can be released through uncooled orifices made of platinum or other material sufficiently refractory to withstand the temperature of the released glass. In fact, in normal partcice it has been found desirable to provide the orifice with means for heating the released glass up to the desired temperature. However, even if the orifice were not heated there would be little tendency for it to freeze up. The drop in temperature of the glass when passing through the orifice normally would not be nearly enough to cause solidification of the glass, since the relatively low releasing temperature of the glass is usually much higher than its solidification temperature. Furthermore, because of the extremely wide working range of glass, little difficulty is encountered in maintaining the poured stream within the working range.

In contrast to the extremely long and low temperature working ranges for glasses, the materials with which the present invention is concerned solidify at 1500° C. or more, and have very narrow working ranges within which satisfactory fiberizing can be carried out. Because of these narrow working ranges, the releasing temperatures of the refractory materials cannot be much higher than their solidifying temperatures. For example, a 50% $Al_2O_3$—50% $SiO_2$ composition solidifies at about 1825° C. and cannot be fiberized satisfactorily above about 1985° C. Because of the extremely high temperatures of these molten refractory materials, they cannot be released through either heated or uncooled orifices—applicant knows of no structural material possessing sufficient refractoriness which is insoluble in and non-reactive with these molten refractory compositions at these high temperatures. Therefore, it is apparent that pouring molten material through an orifice as practiced in the glass-making art is not possible when using refractory compositions of the type with which the present invention is concerned.

This invention can best be understood by reference to the drawings which show a preferred manner of practicing this invention in the producing of fibrous inorganic refractory material, and in which Figure 1 is a side elevation of a melting furnace with the cutaway portion showing the forehearth and releasing apparatus;

Figure 1:
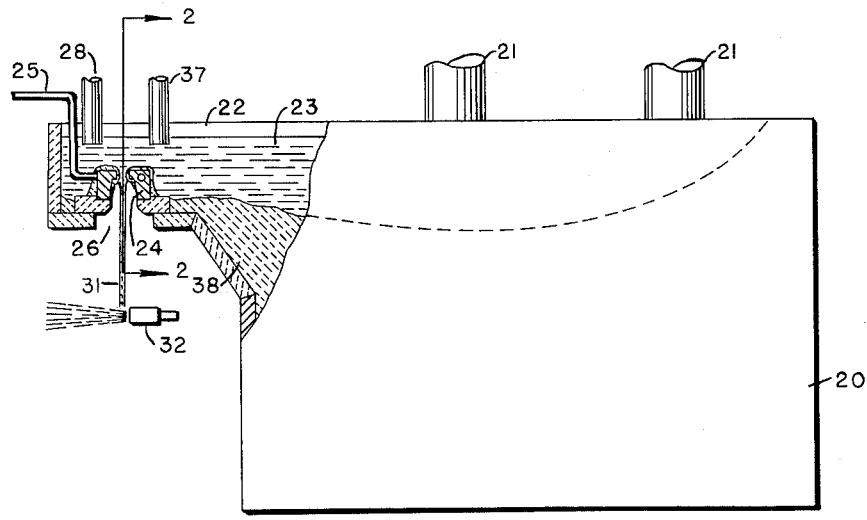
Figure 3:
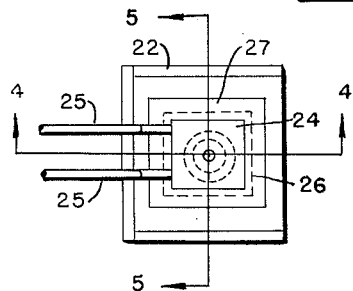
Figure 3 is a top plan view of the forehearth and releasing apparatus, with the electrode left out for clarity.

In the preferred manner of practicing this invention, referring to Figures 1 through 5, refractory material such as that disclosed in U.S. Patent No. 2,557,834, issued to John C. McMullen, is fused in a tilting electric arc open top pot type furnace 20 by electricity introduced through vertically depending heating electrodes 21 suspended above the furnace 20. A forehearth 22 is connected to furnace 20. Raw refractory material is added to the furnace during pouring in sufficient amounts to maintain the level of the molten refractory material 23 sufficiently above the release orifice block 24 during releases by gravity of a substantially vertical stream of the molten refractory material 23. Solidified refractory material 38 acts as thermal and electrical insulation for the furnace 20 and forehearth 22. The orifice block 24 is cooled by water or some other fluid introduced through tubing 25 into a cooling duct 33 in the orifice block 24. The orifice block 24 is positioned above a hole 26 through the floor of the forehearth 22 by seating it in a cavity 35 in the orifice anchoring block 27. Temperature control heating electrodes 28 and 37 are positioned one closer to and one farther from the main bath of molten material 23 than the orifice block 24, which electrodes depend from above into the molten material in the forehearth 22 so that heat will be applied to the molten refractory material in an area adjacent to the orifice, thereby heating the material just prior to its passing through the orifice. Any commonly used means for regulating the power input through electrodes 28 and 37 is provided (not shown). The molten refractory material is superheated sufficiently above its solidifying temperature so that it will pass through the cooled orifice 29 without solidifying and plugging up the orifice and so that it will be at the correct temperature for subsequent fiberizing. The temperature of the molten material just prior to entering the orifice and therefore the temperature after passing through the orifice can be regulated by changing the power input through electrodes 28 and 37. Electrodes 28 and 37 are preferably on a separate circuit from the heating electrodes 21 for ease of controlling the power input through electrodes 28 and 37.

Figure 2:
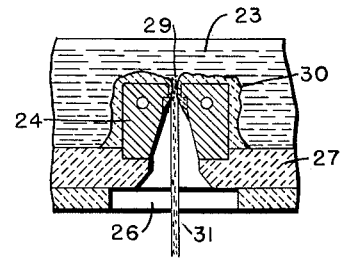
Figure 2 is a vertical sectional view of the orifice along line 2—2 of Figure 1 during the release of the molten refractory material, the electrode being omitted from Figure 2.
Figure 4:
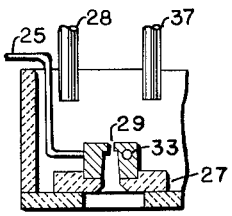
Figure 4 is a vertical sectional view along line 4—4 of Figure 3, showing the forehearth, releasing apparatus, and temperature control electrodes.
Figure 5:
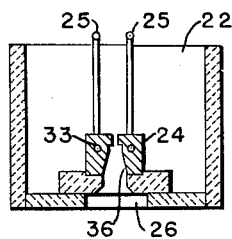
Figure 5 is a vertical sectional view along line 5—5 of Figure 3, showing the forehearth and releasing apparatus.

Referring specifically to Figure 2, as the molten refractory material 23, superheated in an area adjacent to the orifice 29 by temperature control electrodes 28 and 37, passes by the force of gravity through the cooled orifice 29, a protective layer of refractory material solidifies on the surface of the orifice 29 and orifice block 24, forming a refractory ceramic lining 30 for the orifice. This lining 30 insulates the orifice 29 and orifice block 24 from the high temperature of the molten material 23. This lining 30 builds up in thickness until equilibrium is reached between the solidifying effect of the cooling fluid passing through the orifice block 24 and the melting effect on the solidified lining 30 of the hot molten refractory material. The thickness of this lining can be controlled by regulating the power input through the temperature control electrodes 28 and 37 and/or the rate of flow of the orifice coolant, thereby affording a dual control over the effective size of the orifice 29 and so the rate of flow of the molten material through the orifice. This ceramic lining 30 must be maintained sufficiently thick to protect the orifice block 24. Because of the protective lining 30 of solidified refractory material which encrusts the orifice 29 and all parts of the orifice block 24 which are exposed to molten material, there is substantially no corrosion of the orifice 29 or orifice block 24 caused by the extremely high temperature of the molten refractory material 23. Therefore, such an orifice can be used indefinitely although it is made of material which melts at a temperature much lower than the temperature of the molten refractory material 23.

The temperature of the molten stream released from the orifice is affected also by the rate of release of this material. To maintain the released stream at constant temperature, as the rate of release is increased the amount by which the power input exceeds the heat loss from the apparatus must be increased. It is, therefore, apparent that some measure of control over the temperature of the released stream is possible by controlling the effective size of the release orifice. As aforementioned, the effective size of the orifice can be regulated by regulating the rate of flow of coolant through the orifice block. Therefore, control of the flow of the coolant provides an additional means of control over the temperature of the released stream.

Since, in this embodiment of the present invention the molten material is poured through an orifice in the bottom of the forehearth, the path of the released stream is substantially vertical, having substantially no arcuate trajectory as is present in streams poured over a lip in the front wall of a forehearth. It is realized that the direction of the axis of the orifice changes as the furnace is being tilted. However, any horizontal force imparted to the released stream as a result of the axis of the orifice being at an angle to vertical is extremely small, since the angle of the axis to vertical is usually small and the depth of the orifice is small. This small horizontal force is insufficient to impart any substantial arcuate trajectory to the released stream, and so the stream has a substantially vertical path.

Furthermore, the released stream 31 of molten refractory material is uniform as to size, and is at the correct temperature for fiberization by a blast of gas from fiberizing nozzle 32 or by any other commonly employed fiberizing means.

Figure 7:
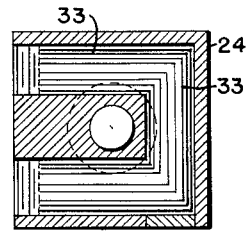
Figure 7 is a top section of the releasing orifice block taken along line 7—7 of Figure 6.
Figure 6:
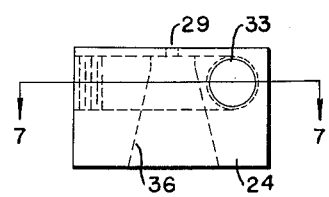
Figure 6 is a side elevation of the releasing orifice block.

Referring now to Figures 6 and 7, in a preferred form of the orifice 29 and orifice block 24, they are machined from a solid block of mild steel about 2¼ inches by 2¼ inches by 1½ inches. Centrally located in a 2¼ inches by 2¼ inches face a hole from ⅜ to ⅝ of an inch in diameter is drilled vertically through the block. This hole is then used as a center hole for a 11/16 inch hole which is drilled from the bottom of the block to within about ⅛ inch of the top face of the block. The sides of this 11/16 inch hole are then tapered from the top of the hole outwardly in a downward direction to a diameter of about 1¼ inches at the bottom surface of the block. The ⅜ to ⅝ inch hole ⅛ inch deep is the orifice 29 and the tapered 11/16 inch hole 36 provides clearance for the released stream of molten refractory material as the furnace 20 is tilted. The cooling duct 33 is made by drilling two ¼ inch duct holes in from the front of the orifice block 24 to within about ⅛ inch of the rear face of the block, the holes being about ¼ inch below the top surface of the block and about ⅛ inch from the vertical hole through the block. A third ¼ inch duct hole is drilled in from one side of the block near the rear of the block so as to intercept the other two duct holes. This hole is then plugged at the surface of the block thereby forming a U-shaped duct 33 in the orifice block 24 around the orifice 29. The open ends of the duct 33 are threaded so as to receive the tubes 25 (shown in Figures 1 and 3 through 5) which introduce cooling fluid into the orifice block 24.

Figure 8:
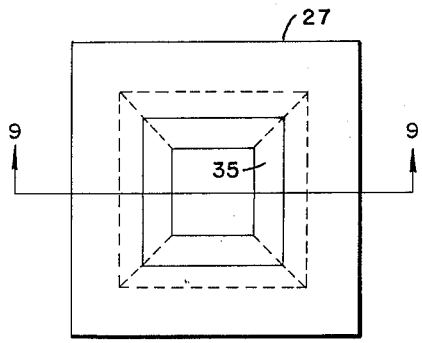
Figure 8 is a top plan view of the orifice anchoring block.
Figure 9:
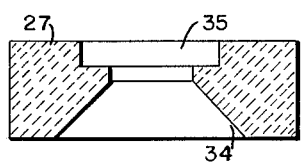
Figure 9 is a section of the orifice anchoring block taken along line 9—9 of Figure 8.

Referring now to Figures 8 and 9, the orifice block 24 is seated in a cavity 35 in the orifice seating block 27 and is thereby positioned above the hole 26 through the forehearth bottom. The cavity 35 in the orifice seating block 27 is dimensioned to fit the orifice block 24. Vertically through the orifice seating block 27 is a hole 34 which is positioned directly below the orifice. This hole 34 tapers outwardly in a downward direction as shown to provide sufficient clearance for the stream of molten refractory material as the furnace is tilted during pouring. The block 27 may be made of any material which is sufficiently resistant to high temperatures and which does not introduce undesirable impurities into the molten bath. For example, this block may be a unitary fused cast aluminum oxide refractory brick cast to the correct dimensions. Although this material will be dissolved slowly by the molten refractory material, it is not a harmful impurity. In some cases it is desirable to cool block 27 by a built in fluid cooling duct, thereby protecting it from the high temperatures of the molten refractory material.

When the orifice block is made of an electrically conducting material it should be electrically insulated from the metal shell of the melting furnace and also from ground. If this is not done there is apt to be flow of electricity from the electrodes to the orifice block which can overheat and destroy the orifice block. Nevertheless, if the orifice block has too great an upper surface area there is apt to be some passage of current through the orifice block even though it is electrically insulated from the furnace shell and ground. That is, if the electrical resistance of a path from the electrode through the molten material to the orifice block, horizontally through the orifice block, and then through the molten material to the other electrode in the circuit is of the same general magnitude as the electrical resistance of a path directly between the electrodes through the molten material, some current will run through the orifice block, possibly overheating and destroying it. Therefore, it is desirable to make the orifice block as small as possible.

The diameter of the orifice can be varied over a wide range. In general it must be sufficiently large so that after the protective layer of solidified material forms on the orifice during pouring there is still a large enough opening for a substantial stream of molten material to be released. For fiberizing refractory material in accordance with the present invention, the stream of molten material should preferably be at least ¼ inch in diameter, and must be at least ⅛ inch in diameter. Therefore, the orifice diameter must be greater than ⅛ inch. The orifice can be as large as desired, being limited by the size of stream which the fiberizing means can fiberize. Very satisfactory results have been obtained with the orifice from ⅜ inch to ⅝ in diameter.

When using an orifice and orifice block of the general shape disclosed in the preferred practice and other comparable shapes, it is desirable that the orifice depth be small, preferably not to exceed ⅛ of the diameter of the orifice. By orifice depth is meant the depth of the part of the hole through the orifice block which will be in actual contact with the molten material. Therefore, if an orifice of the above-mentioned design is ½ inch in diameter, the orifice depth preferably is 1/16 inch or less. If the depth of such an orifice is not maintained within this limitation, solidification of the molten material is apt to occur plugging up the orifice.

While the specific example hereinbefore set forth describes the preferred manner of practicing this invention it is to be pointed out that the invention is susceptible to many modifications. For example, the orifice block can be made in numerous shapes and sizes. It can be made of almost any highly heat conductive water-tight material such as metals and metalloids, and can be cast or fabricated from plate stock as well as machined from a solid block. If highly heat resistant material is used to construct the orifice block it has the added advantage that, if the orifice should plug up with solidified material, the velocity of the orifice block coolant can be temporarily reduced without excessive damage to the orifice, causing the solidified material which is plugging the orifice to be fused, thereby unplugging the orifice. Furthermore, it is not essential that the hole through the orifice block be tapered outwardly in a downward direction. While this design is advantageous when pouring from a tilting furnace, in other manners of practicing this invention inversely tapered and cylindrical holes are desirable.

While it is preferred to employ an orifice anchoring block for ease of installing and positiveness of positioning the orifice, as well as for insulating the orifice block from the melting furnace shell, this element can be omitted. In such a case the orifice block can rest in a cavity in a forehearth wall, or can be anchored positively to a forehearth wall, just so long as it is electrically insulated from the furnace shell and ground, if made of electrically conductive material.

As a coolant for the orifice block, while water is highly satisfactory, many other conventional cooling fluids such as air or mercury can be used.

While this invention has been described as it relates to pouring through only a single orifice and having only two electrodes in the forehearth, it is within the scope of this invention to have a plurality of orifices in combination with three or more heating electrodes in the forehearth so that a plurality of streams of molten refractory material may be released and fiberized simultaneously.

It is to be understood that, although the preferred practice of the present invention is described as applied to releasing a stream of molten material for subsequent fiberizing, it is contemplated that this invention may be applied to releasing a molten stream for other purposes, such as for blowing pellets and bubbles or for filling casting molds. Therefore, this invention is not to be construed as limited to releasing a stream for fiberizing.

I claim:

1. In apparatus for releasing from a melting furnace by gravity a continuous substantially vertical stream of molten refractory material at a temperature higher than 1500° C., the combination of a forehearth connected to the melting furnace, at least one fluid cooled orifice at least ⅛ inch in diameter through an orifice block positioned in register with an opening in the bottom of said forehearth, said orifice block having a fluid cooling duct internal thereof and adjacent said orifice, and temperature control heating electrodes depending into said forehearth.

2. Apparatus for releasing a continuous uniform substantially vertical stream of molten refractory material from a melting furnace by gravity comprising a forehearth having a hole through the bottom, a heat-resistant block resting on the bottom of the forehearth having a hole through said block in register with the hole through the bottom of the forehearth, a block of highly heat-conducting water-tight material with a melting temperature lower than the temperature of the molten refractory material which is to be released resting on said heat resistant block having an orifice through said heat-conducting block in register with and smaller in diameter than the holes through the heat resistant block and forehearth bottom, said heat-conducting block being electrically insulated from the shell of the melting furnace and ground, duct means internal of said heat-conducting block and adjacent said orifice therethrough for fluid cooling said heat-conducting block a regulated amount, and temperature control heating electrodes positioned above said forehearth and depending vertically into said forehearth.

3. Apparatus as in claim 2 in which the orifice through the heat-conducting block is outwardly tapered in a downward direction.

4. Apparatus for releasing a continuous uniform stream of molten refractory material from a melting furnace comprising a forehearth into which molten material is introduced from a melting furnace, said forehearth having an opening through the bottom, at least one temperature control heating electrode positioned above said forehearth and depending vertically into said forehearth, an orifice block having an orifice therethrough in register with the opening through the forehearth bottom, and cooling duct internal of the orifice block and adjacent the orifice therethrough for fluid cooling said orifice block a regulated amount.

5. Apparatus for releasing at least one continuous stream of molten refractory material from a melting furnace comprising a forehearth into which molten material is introduced from a melting furnace, at least one temperature control heating electrode depending into the forehearth for applying a regulated amount of heat to the molten refractory material in an area adjacent to the orifice, and at least one orifice through an orifice block positioned in register with an opening through the forehearth, said orifice block being made of material which melts at a temperature lower than the temperature of the molten refractory material that is to be released therethrough, and a cooling duct internal of the orifice block and adjacent the orifice.

6. Apparatus for releasing from a melting furnace at least one continuous stream of molten refractory material at a temperature greater than about 1500° C. comprising a forehearth into which molten material is introduced from a melting furnace, temperature control heating electrodes extending into the forehearth for applying a regulated amount of heat to the molten refractory material in an area adjacent to the orifice, and at least one orifice through an orifice block positioned in register with an opening in the floor of the forehearth, said orifice block being made of material which melts at a temperature lower than 1500° C., and a cooling duct internal of the orifice block and adjacent the orifice.

7. The process for releasing a stream of molten refractory material from a melting furnace comprising applying heat to the molten refractory material just prior to its being released from said furnace, releasing the molten material through an orifice, removing heat from the molten material as it passes through said orifice, cooling the orifice wall throughout its depth so as to maintain said orifice wall at a temperature lower than the melting temperature of both the molten refractory material and said orifice wall to form on the surface of said orifice wall a solidified layer of said refractory material of sufficient thickness to protect said orifice wall from the high temperature of the molten refractory material.

8. In the process of making refractory fibrous material from compositions having a melting temperature higher than 1500° C., the steps of melting the refractory material, flowing the molten refractory material from the main melting bath to an area adjacent at least one releasing orifice, applying a regulated amount of heat to the molten material just prior to its passing through said orifice, releasing the molten material through said orifice, removing a controlled amount of heat from the molten material as it passes through said orifice by cooling the orifice wall whereby the released material is at the correct temperature for fiberizing to form on the surface of said orifice wall a solidified layer of said refractory material of sufficient thickness to protect said orifice wall from the high temperature of the molten refractory material.

9. The process of making refractory fibrous material comprising melting refractory material, applying a regulated amount of heat to the molten refractory material just prior to its passing through at least one releasing orifice to superheat the material being released, releasing through said orifice by gravity a continuous uniform stream of molten refractory material for subsequent fiberizing, cooling said orifice by passing a fluid coolant through the walls thereof to form a solidified layer of refractory material on the surface of said orifice, and subsequently fiberizing said released stream of molten refractory material.

10. The process of making refractory fibrous material comprising melting refractory material, electrically applying a regulated amount of heat to the molten refractory material just prior to its passing through at least one releasing orifice to superheat the material being released, releasing through said orifice by gravity for subsequent fiberizing a continuous uniform substantially vertical stream of molten refractory material at least ⅛ inch in diameter, cooling said orifice by passing a fluid coolant through the walls thereof to form a solidified layer of refractory material on the surfaces of said orifice, and fiberizing said released stream of molten refractory material.

11. The process for releasing a stream of molten refractory material from a melting furnace comprising applying heat to the molten refractory material just prior to its being released through at least one orifice, releasing the molten material through said orifice, cooling said orifice wall by passing a fluid coolant therethrough to form on the surface of said orifice wall a solidified layer of said refractory material of sufficient thickness to protect said orifice wall from the high temperature of the molten refractory material.

(References on following page)

References Cited in the file of this patent

UNITED STATES PATENTS

| | | | |
|---|---|---|---|
| 617,748 | Hurley | Jan. 17, | 1899 |
| 686,836 | Ruthenburg | Nov. 19, | 1901 |
| 775,031 | Franklin | Nov. 15, | 1904 |
| 1,458,522 | Clark | June 12, | 1923 |
| 2,014,615 | Ferguson | Sept. 17, | 1935 |
| 2,143,096 | Wadsworth | Jan. 10, | 1939 |
| 2,165,318 | Thomas et al. | July 11, | 1939 |
| 2,181,030 | Thomas | Nov. 21, | 1939 |
| 2,186,718 | Ferguson | Jan. 9, | 1940 |
| 2,188,927 | Slayter | Feb. 6, | 1940 |
| 2,190,296 | Richardson | Feb. 13, | 1940 |
| 2,215,982 | Slayter et al. | Sept. 24, | 1940 |
| 2,257,767 | Slayter et al. | Oct. 7, | 1941 |
| 2,276,295 | Ferguson | Mar. 17, | 1942 |
| 2,283,800 | Ferguson | May 19, | 1942 |
| 2,303,657 | Parsons | Dec. 1, | 1942 |
| 2,335,135 | Staelin | Nov. 23, | 1943 |
| 2,501,119 | Zvanut et al. | Mar. 21, | 1950 |
| 2,714,622 | McMullen | Aug. 2, | 1955 |